March 6, 1934.  W. J. MEINEL  1,949,615
METHOD OF FORMING IRREGULAR SHEET METAL STAMPINGS
Original Filed Dec. 21, 1927
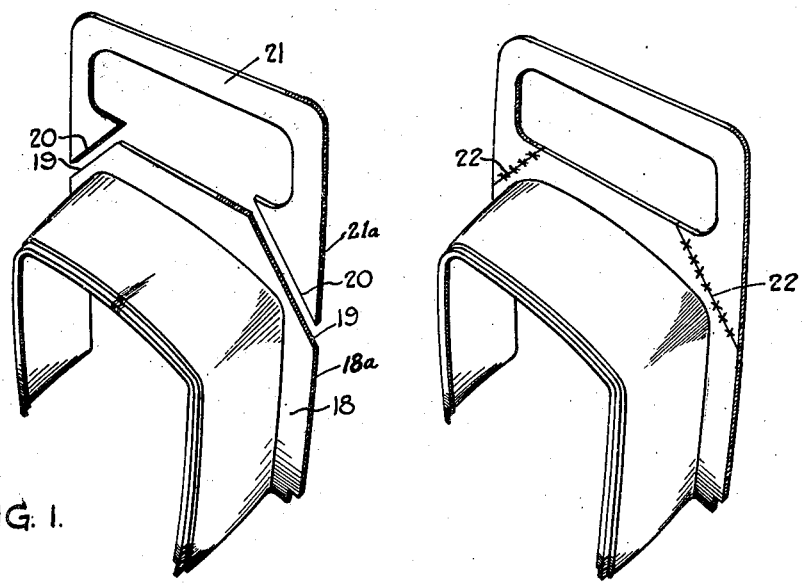
FIG. 1.
FIG. 2.
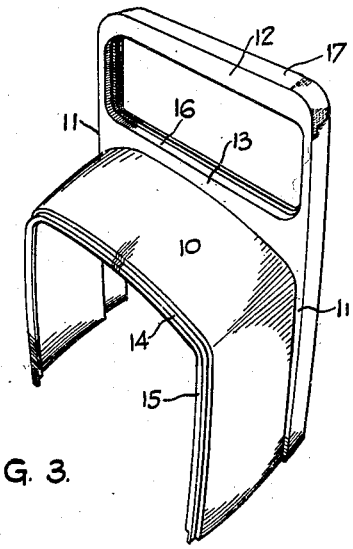
FIG. 3.
INVENTOR.
WILLIAM J. MEINEL.
BY
ATTORNEY.

Patented Mar. 6, 1934

1,949,615

UNITED STATES PATENT OFFICE 1,949,615

METHOD OF FORMING IRREGULAR SHEET METAL STAMPINGS

William John Meinel, Philadelphia, Pa., assignor to Edward G. Budd Manufacturing Co., Philadelphia, Pa., a corporation of Pennsylvania Application December 21, 1927, Serial No. 241,700
Renewed March 31, 1932

8 Claims. (Cl. 113—116)

My invention relates to a method of forming, from flat sheet metal stock, irregular stampings of sheet metal and particularly such stampings having expansive portions extending substantially at right angles to each other, and in which one of said portions is formed, in a plane parallel to the other portion, on a relatively abrupt curvature. Such stampings are represented by the cowl and a portion of or the entire windshield frame of a front for automobile bodies. It is with reference to such automobile front structures that my invention will herein be specifically described.

It has heretofore been proposed to simplify the manufacture of automobile body fronts including the cowl portions of the A-posts, and a portion of the windshield frame by constructing the same of a single unitary outer stamping forming the outside of the sides and top of the cowl proper of the front post or A-post structures and the fronts and sides of the windshield structure.

Similarly it was proposed to reinforce this outer stamping if found necessary or desirable, by a corresponding inner mating stamping adapted to be joined to the outer stamping in the margins of the windshield opening and in the outer margins to form a closed hollow front structure.

The economical formation of these and other large stampings from flat stock is the main object of my invention, and I accomplish this object by first forming, to substantially their final shape, those curved portions which would require a relatively deep drawing if the entire front were made out of a single flat sheet, such as the cowl proper, and thereafter welding to the part so formed a flat or, in some cases, a pre-formed sheet extending at right angles to the curved portion, the whole or a part being then subjected to further die drawing operations to form the complete front, either the inner or the outer stamping, as desired.

In the accompanying drawing, I have illustrated more or less diagrammatically one manner of practicing my novel improved method as applied to the forming of the outer cowl and portions of the A-posts and windshield as a unitary stamping. In this drawing, Fig. 1 represents the cowl substantially in its final form and shows in slightly spaced relation a flat sheet to be welded thereto.

Fig. 2 represents the same parts welded together to form an integral unit, and

Fig. 3 represents the completely formed front unitary stamping.

One form of front unitary stamping adapted to be advantageously formed by the practice of my invention from flat sheets of metal, such as steel, comprises, as shown in Fig. 3, the sides and top of the cowl proper 10, the front post portions 11, which extend above the cowl and form the sides of the windshield frame and the upper and lower windshield headers 12 and 13.

The front edge of the cowl may be of any usual construction, it being shown here as having an offset 14 to receive the rear edge of the hood, and an inwardly extending edge flange 15. The posts and windshield frame are generally of rearwardly presenting channel section, the sheet being flanged rearwardly and then inwardly, as shown at 16, around the windshield opening, and the sides of the posts and top of the top windshield header being flanged rearwardly as indicated at 17. Further edge formations are in practice provided at the rear edge of the unitary stamping, but it is not thought necessary to go into these details to make clear the practice of my improved method.

It will be evident that such an article as that just described having a relatively deep cowl portion would be almost impossible of formation from a flat sheet of metal, and if possible of formation, could be formed only, with the methods of manufacture now known, by the use of very complicated and expensive die and frequent annealing operations.

I have found, however, that I am able to form it relatively inexpensively and with little if any annealing, by first forming the sides and top of cowl portion proper, the front edge formations being preferably produced at this time, and also the rear edge flange 18 which may, as shown, lie substantially in a single plane and extend around the sides and top, and be relatively narrow at the corners of the cowl.

When this rear flange 18 has been trimmed, as shown in Fig. 1, it is provided with two laterally inclined edges 19, 19 which are adapted to mate with corresponding edges 20, 20 formed on a flat sheet 21, which is preferably first trimmed to remove the metal at the windshield opening and to give to it the general external contour of the windshield frame. The side edges 18a of the flange 18 are preferably in alinement with the side edges 21a of the flat sheet 21.

With the flange 18 and sheet 21 held in substantially the same plane, the edges 19, 19 and 20, 20 are then brought together in abutting relation and welded either by a flash welding operation or any other suitable welding operation, along the line 22, see Fig. 2.

The unitary welded structure, as shown in Fig. 2, in which the cowl proper is substantially in its final form and the front post and windshield portions are substantially flat and of uniform thickness throughout, is then subjected to further forming operations, such as suitable relatively simple die stamping operations, directed substantially normal to the plane of said windshield portion and brought to their final form, as shown in Fig. 3. In such final operation, the combined structure may be further die drawn not only in remote portions, but also across the line of the weld.

By the practice of my invention, I am able to secure marked economies in manufacture, since I am able to use smaller sheets, I use relatively simple die operations, and the number of such operations is relatively few, I dispense almost if not entirely with annealing operations, and I greatly reduce the number of rejects and torn stampings, while I attain all of the advantages of making the entire front, outer or inner panel, a single unitary stamping.

While I have herein described and illustrated one specific manner in which my invention may be practiced, and a specific article formed by my improved method, it will, of course, be understood that it can be modified or varied in many respects without departing from the spirit and scope of the appended claims which are intended to include such modifications.

It will also be understood that my improved method may be used in the formation of other articles than the specific article shown, which require deep drawing operations to form an article having portions extending substantially at right angles of each other, or generally in cases where it is desired to produce large unitary stampings of any form out of a plurality of relatively small sheets of metal, integrally united, and I intend herein to claim such method broadly unrelated to any specific article as well as directed to the specific article in connection with which I have herein disclosed its use.

What I claim is:—

1. The method of forming a unitary cowl front and windshield structure out of flat sheet metal stock which consists in forming the sides and top of the cowl in substantially its final form, then welding to the rear edge of the part so formed, another sheet to form a portion of the windshield frame, and then finally forming the combined cowl and windshield structure out of the unitary sheet so formed.

2. The method of forming a unitary cowl and windshield structure out of flat metal sheet stock which consists in forming the sides and top of the cowl and lateral flanges at the rear vertical edges, then welding to said lateral flanges a flat sheet cut-out to provide a windshield opening, and finally forming the combined unitary cowl and windshield structure out of the unitary sheet so formed.

3. The method of forming a unitary cowl, front and windshield structure out of flat metal sheets which consists in forming the sides and top of the cowl and a rear laterally extending flange extending around the sides and top, in welding to the sides of said flange a flat sheet of substantially inverted U-shape to form the sides and top of the windshield frame, and finally subjecting said combined unitary sheet to further forming operations to form the complete unitary cowl, front and windshield structure.

4. The method of die forming a unitary cowl and windshield frame which consists in first forming the sides and top of the cowl portion out of one sheet, then welding a second sheet to the rear edge of the part so formed so as to cause said second sheet to extend in a direction substantially transversely to the cowl portion, and then forming said second sheet by a die operation directed generally in a direction substantially normal to said second sheet to form the windshield frame portion.

5. The method of forming, from flat sheet metal stock, a unitary stamping having portions extending substantially at right angles to each other, one of said portions being arranged substantially in one plane while the other portion extends laterally therefrom and is of curved cross section when cut in a plane adjacent to and parallel to the plane of the other portion, which consists in first forming the curved portion, then welding to the edge of said curved portion a flat sheet extending laterally substantially at right angles to the curved portion, and then forming said flat sheet by a die operation or operations directed generally in a direction normal thereto.

6. The method of die forming, from flat sheet metal stock, a unitary stamping having portions thereof arranged substantially at right angles to each other, one of said portions extending in one plane and the other portion extending laterally therefrom and being of curved cross-section when cut in a plane parallel to the plane adjacent to and of the other portion, which consists in first forming said portion of curved cross section to substantially its final form and provided with a transverse flange along its curved edge, then welding to said flange a flat sheet and then forming said sheet by additional forming operations.

7. The method of forming, from sheet metal stock, a unitary stamping having portions extending at an angle to each other, one of said portions being arranged substantially in one plane while the other portion extends laterally therefrom, which consists in forming said laterally extending portion, then welding to the edge of said laterally extending portion a sheet extending substantially at an angle to the laterally extending portion, and then additionally forming said joined portions by a die drawing operation or operations directed generally normal to the plane of the sheet and including the joint in the area of the draw.

8. The method of forming, from flat sheet stock, a unitary stamping having portions extending substantially at right angles to each other, one portion being curved in cross-section; which consists in first forming the curved portion with a marginal flange extending around the same at an angle thereto, then welding to the edge of said flange, in abutting relation, the edge of a flat sheet, and then forming said united flange and sheet by a die operation directed generally normal to said sheet and across the line of weld.

WILLIAM JOHN MEINEL.